United States Patent
Kanayama et al.

(10) Patent No.: US 9,777,616 B1
(45) Date of Patent: Oct. 3, 2017

(54) DUMP TRUCK

(71) Applicant: Komatsu Ltd., Minato-ku, Tokyo (JP)

(72) Inventors: Takamu Kanayama, Hitachinaka (JP); Yuuki Ishikawa, Mito (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 15/110,020

(22) PCT Filed: Mar. 31, 2016

(86) PCT No.: PCT/JP2016/060698
§ 371 (c)(1),
(2) Date: Jul. 6, 2016

(87) PCT Pub. No.: WO2016/163300
PCT Pub. Date: Oct. 13, 2016

(51) Int. Cl.
| | | |
|---|---|---|
| *B60K 13/04* | (2006.01) |
| *F01P 5/02* | (2006.01) |
| *B60K 11/06* | (2006.01) |
| *B60K 13/06* | (2006.01) |
| *F01N 3/24* | (2006.01) |

(52) U.S. Cl.
CPC .......... *F01P 5/02* (2013.01); *B60K 11/06* (2013.01); *B60K 13/04* (2013.01); *B60K 13/06* (2013.01); *F01N 3/24* (2013.01)

(58) Field of Classification Search
CPC ...... F01N 2340/04; B60K 13/04; B60K 13/06
USPC .................................................. 180/309
See application file for complete search history.

(56) References Cited

U.S. PATENT DOCUMENTS

| | | | | |
|---|---|---|---|---|
| 3,664,706 A * | 5/1972 | Chant | .......... | B60K 13/06 137/875 |
| 3,913,705 A * | 10/1975 | Sieving | .......... | B60K 13/04 180/309 |
| 8,191,668 B2 * | 6/2012 | Keane | .......... | B60K 13/04 180/296 |
| 8,381,865 B2 * | 2/2013 | Okada | .......... | E02F 9/00 180/296 |

(Continued)

FOREIGN PATENT DOCUMENTS

| | | |
|---|---|---|
| CA | 2898553 | 2/2016 |
| CN | 1993037 | 7/2007 |

(Continued)

OTHER PUBLICATIONS

International Search Report in International Application No. PCT/JP2016/060698, mailed Jun. 21, 2016, 8 pages, Japanese only.

(Continued)

*Primary Examiner* — Jeffrey J Restifo
(74) *Attorney, Agent, or Firm* — Fish & Richardson P.C.

(57) ABSTRACT

A dump truck includes: a vehicle body; a cooling fan disposed in front of the vehicle body in a travel direction; an engine disposed behind the cooling fan; a platform covering the cooling fan and a top of the engine; an exhaust aftertreatment device disposed behind the engine and above the platform; an opening through which an upper side of the platform communicates with a lower side thereof and provided in front of the exhaust aftertreatment device; and a duct provided to a lower surface of the platform and comprising a base-end opening connected to the opening and a leading-end opening directed to the cooling fan.

5 Claims, 8 Drawing Sheets

(56) References Cited

U.S. PATENT DOCUMENTS

| | | | |
|---|---|---|---|
| 8,827,029 B1* | 9/2014 | Nakagami | E02F 9/0866 180/296 |
| 8,997,915 B2* | 4/2015 | Hayashi | B60K 13/04 180/296 |
| 9,016,426 B2* | 4/2015 | Himoto | E02F 9/0833 180/296 |
| 9,016,428 B2* | 4/2015 | Numa | F01N 3/2066 180/296 |
| 9,027,697 B2* | 5/2015 | Kobayashi | E02F 9/0875 180/296 |
| 9,033,095 B2* | 5/2015 | Sakai | F01N 13/1805 180/309 |
| 9,180,774 B2* | 11/2015 | Mizuno | B60K 13/04 |
| 9,238,901 B2* | 1/2016 | Kamimae | B60K 13/04 |
| 9,382,690 B2* | 7/2016 | Okuda | B60K 13/04 |
| 9,441,527 B2* | 9/2016 | Kamimae | E02F 9/0833 |
| 9,453,326 B2* | 9/2016 | Shimohira | E02F 9/0841 |
| 9,482,139 B2* | 11/2016 | Ashikawa | F01N 13/18 |
| 2011/0155263 A1 | 6/2011 | Mitsuda et al. | |
| 2013/0068177 A1* | 3/2013 | Yotsuzuka | E02F 9/0866 123/41.58 |
| 2013/0319787 A1* | 12/2013 | Kobayashi | E02F 9/0866 180/309 |
| 2014/0124284 A1* | 5/2014 | Sekiya | B60K 13/04 180/309 |
| 2014/0151143 A1 | 6/2014 | Nakashima et al. | |
| 2014/0182963 A1* | 7/2014 | Sekiya | B60K 13/04 180/309 |
| 2014/0238767 A1* | 8/2014 | Numa | F01N 3/2066 180/309 |
| 2014/0299401 A1* | 10/2014 | Nakagami | E02F 9/0866 180/309 |
| 2014/0318882 A1* | 10/2014 | Sawada | B60K 13/04 180/309 |
| 2014/0326527 A1* | 11/2014 | Harada | E02F 9/0866 180/309 |
| 2015/0184568 A1* | 7/2015 | Maeda | F01N 3/0814 60/286 |
| 2015/0233089 A1* | 8/2015 | Kamimae | E02F 9/0866 180/309 |
| 2015/0275475 A1* | 10/2015 | Yamagoe | E02F 9/0866 180/309 |
| 2015/0299981 A1* | 10/2015 | Hayashi | E02F 9/0866 180/309 |
| 2015/0306950 A1* | 10/2015 | Sandou | E02F 9/0866 60/297 |
| 2015/0315764 A1* | 11/2015 | Yamashita | F01N 3/2066 180/309 |
| 2015/0330056 A1* | 11/2015 | Himoto | E02F 9/0866 180/309 |
| 2015/0376867 A1* | 12/2015 | Kobayashi | E02F 3/7645 180/309 |
| 2016/0053463 A1* | 2/2016 | Kamimae | E02F 9/0866 180/309 |
| 2016/0069043 A1* | 3/2016 | Kamimae | B60K 13/02 180/309 |
| 2016/0115840 A1* | 4/2016 | Azuma | F01N 13/009 180/309 |
| 2016/0137054 A1* | 5/2016 | Ueta | B60K 13/04 180/309 |
| 2016/0201543 A1* | 7/2016 | Ashikawa | B62D 21/186 180/309 |
| 2016/0215477 A1* | 7/2016 | Kumagai | B60K 13/04 |
| 2016/0257194 A1* | 9/2016 | Ashikawa | B60K 13/04 |
| 2016/0273441 A1* | 9/2016 | Kikuchi | F01N 13/1822 |
| 2017/0009628 A1* | 1/2017 | Kimura | F01N 3/2066 |

FOREIGN PATENT DOCUMENTS

| | | |
|---|---|---|
| CN | 102159817 | 8/2011 |
| CN | 102770603 | 11/2012 |
| CN | 103688029 | 3/2014 |
| CN | 104838105 | 8/2015 |
| JP | 2002-070077 | 3/2002 |
| JP | 3586419 | 11/2004 |
| WO | WO 2015/125374 | 8/2015 |

OTHER PUBLICATIONS

Office Action from corresponding Chinese Application No. 201680000557.2, dated Apr. 6, 2017, 7 pages, with English translation.

* cited by examiner

ID.

DUMP TRUCK

CROSS-REFERENCE TO RELATED APPLICATIONS

This application claims priority to International Application No. PCT/JP2016/060698 filed on Mar. 31, 2016, the contents of which are incorporated herein in their entirety.

TECHNICAL FIELD

The present invention relates to a dump truck.

BACKGROUND ART

It is typically known that particulate matters (PM) contained in an exhaust gas from a combustion engine (e.g., a diesel engine) is captured by a dedicated filter (DPF: Diesel Particulate Filter). An exhaust aftertreatment device provided with the DPF is installed in a working vehicle (e.g., a dump truck and a wheel loader) including a diesel engine due to the necessity of compliance to exhaust gas regulation. The exhaust aftertreatment device is provided in a course of an exhaust path from the engine (see, for instance, Patent Literature 1).

In a working vehicle that travels on a rough ground and a wet and soft ground of a mine and the like, when the exhaust aftertreatment device is disposed on a lower side of the working vehicle, the exhaust aftertreatment device may be hit by pebbles thrown up during travelling of the working vehicle, or the working vehicle may sink in a wet ground together with the exhaust aftertreatment device to damage the exhaust aftertreatment device. For this reason, in the dump truck, the exhaust aftertreatment device is mounted on a platform covering the engine. For instance, in a dump truck of Patent Literature, the engine is disposed under the platform while the exhaust aftertreatment device is disposed to a backside of the engine and on the platform.

CITATION LIST

Patent Literature(s)

Patent Literature 1: International Publication No. WO2015/125374

SUMMARY OF THE INVENTION

Problems to be Solved by the Invention

An exhaust aftertreatment device provided with a DPF and the like need to be regenerated before a filter is clogged. Accordingly, the exhaust aftertreatment device includes: a differential pressure sensor for measuring a differential pressure between an intake hole and an exhaust hole of the exhaust aftertreatment device; and a temperature sensor for measuring a temperature of the DPF.

The differential sensor and the temperature sensor are provided near the exhaust aftertreatment device and need to be cooled because the differential sensor and the temperature sensor break down at a high temperature. For this reason, a structure for efficiently cooling the exhaust aftertreatment device provided with the differential sensor and the temperature sensor is desired.

However, Patent Literature 1 fails to disclose technique on a flow of a cooling air to cool the differential sensor provided in the exhaust aftertreatment device.

An object of the invention is to provide a dump truck configured to efficiently cool an exhaust aftertreatment device to prevent breakdown of sensors and the like.

Means for Solving the Problems

According to an aspect of the invention, a dump truck includes: a vehicle body; a cooling fan disposed to a front side of the vehicle body in a travel direction; an engine disposed behind the cooling fan; a platform covering the cooling fan and a top of the engine; an exhaust aftertreatment device disposed behind the engine and above the platform; a communication opening that is provided in front of the exhaust aftertreatment device and through which an upper side of the platform communicates with a lower side thereof; and a duct provided to a lower surface of the platform and including a base-end opening connected to the communication opening and a leading-end opening directed toward the cooling fan.

According to the above aspect of the invention, since the base-end opening is connected to the communication opening through which the upper side of the platform communicates with the lower side thereof and the leading-end opening includes the duct facing an air blowing surface of the cooling fan, a cooling air of the cooling fan can be guided to the exhaust aftertreatment device through the duct, so that the exhaust aftertreatment device can be efficiently cooled to prevent failure of a sensor and the like.

Moreover, since the engine is separated from the exhaust aftertreatment device by the platform to position the engine under the platform and the exhaust aftertreatment device above the platform, the exhaust aftertreatment device can be prevented from being heated, so that the failure of the sensor and the like can be more reliably prevented.

In the above arrangement, it is preferable that the dump truck further includes a cover covering the communication opening and the exhaust aftertreatment device; and an exhaust hole formed on a lateral side of the cover behind the exhaust aftertreatment device.

In the above arrangement, it is preferable that the dump truck further includes a partition plate provided between the communication opening and the exhaust aftertreatment device in a manner to stand up from the platform.

In the above arrangement, it is preferable that the exhaust aftertreatment device is disposed so that a longitudinal side of the exhaust aftertreatment device conforms to the travel direction.

In the above arrangement, it is preferable that the duct includes a leading-end opening inclined with respect to a rotation tangential direction of an upper part of the cooling fan.

DESCRIPTION OF EMBODIMENT(S)

[1] Overall Structure of Dump Truck 1

Figure 1:
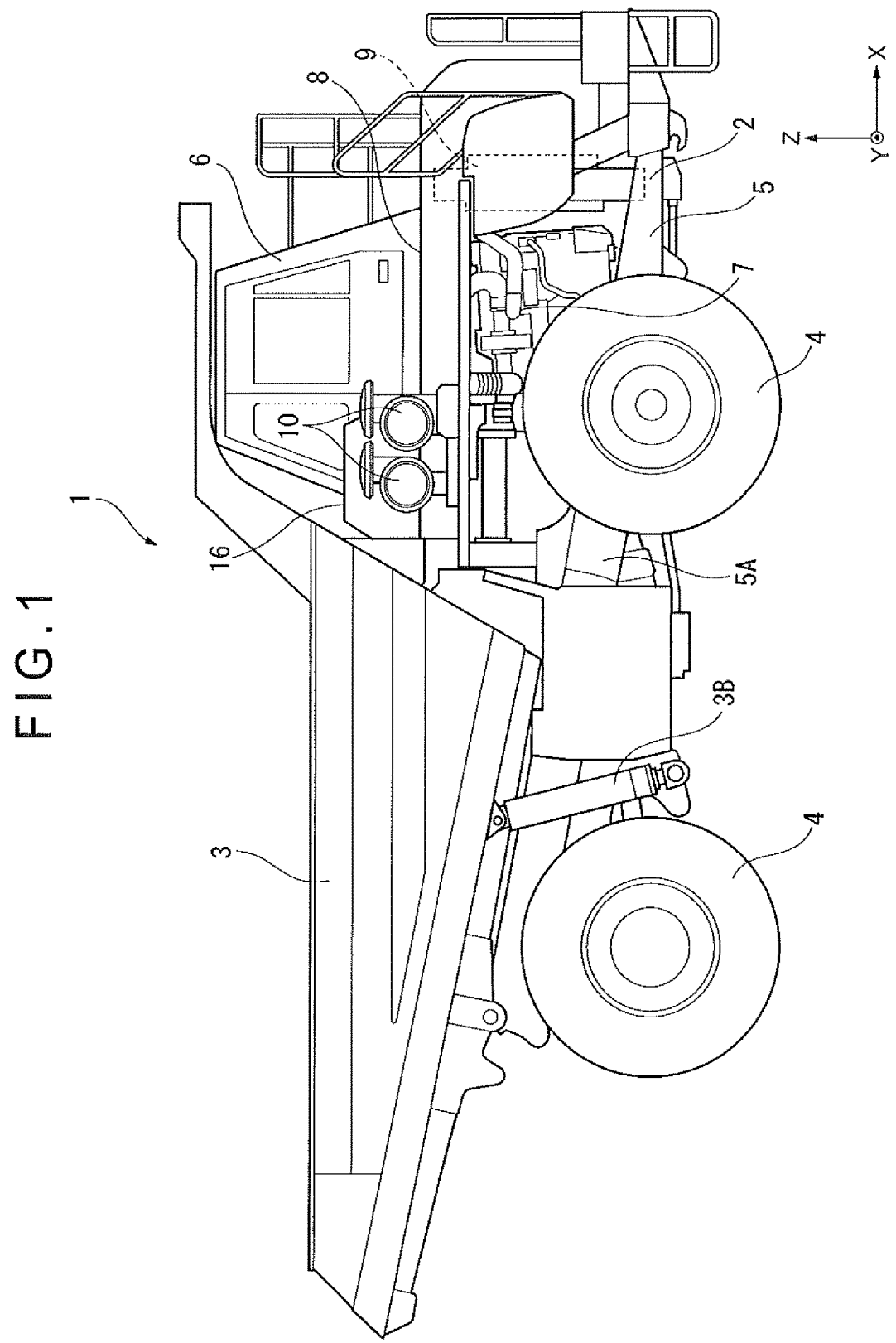
FIG. 1 is a side elevational view of a dump truck according to an exemplary embodiment of the invention.
Figure 2:
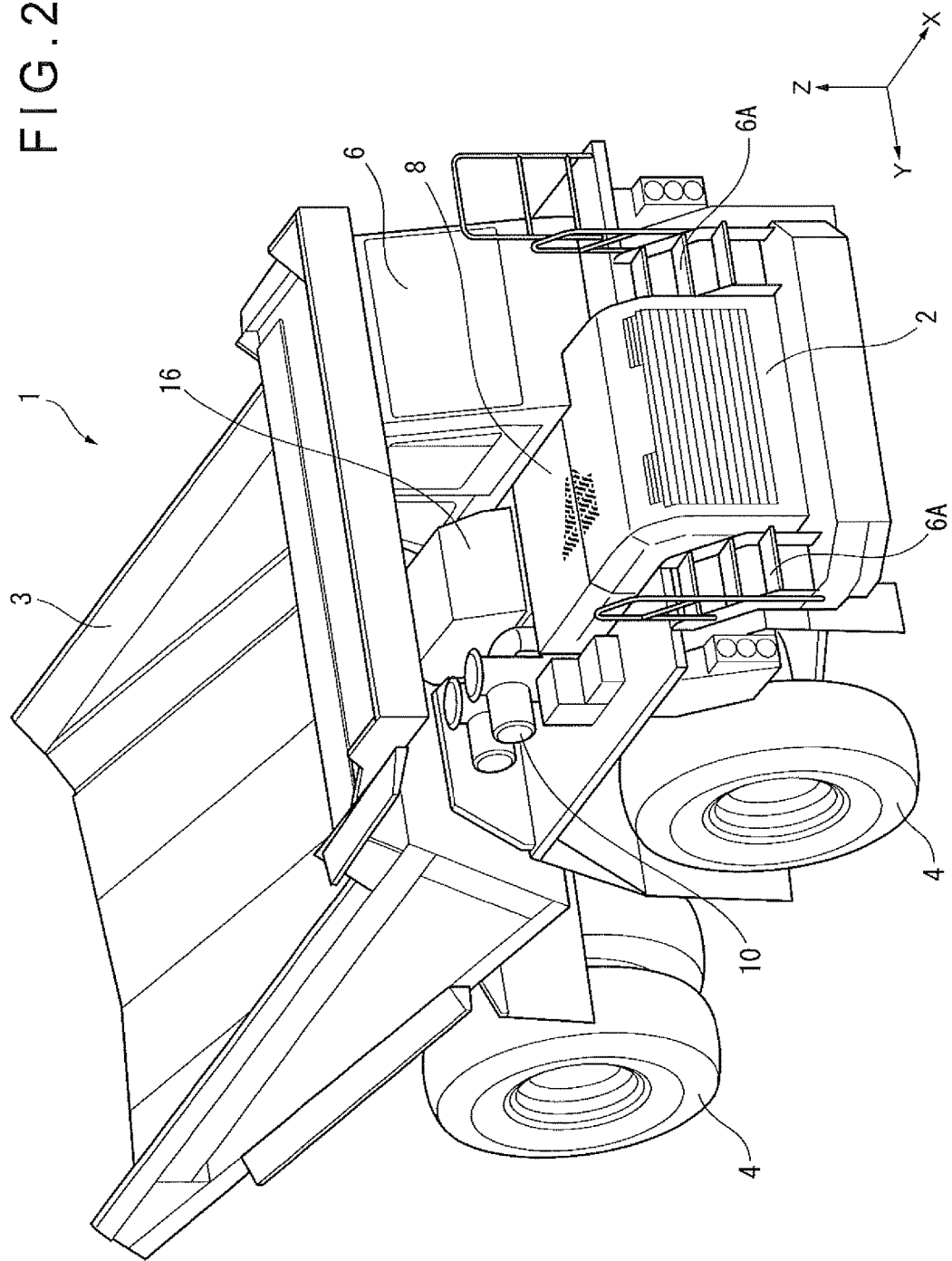
FIG. 2 is a perspective view showing the dump truck according to the above exemplary embodiment.

FIGS. 1 and 2 show a dump truck 1 according to an exemplary embodiment of the invention. FIG. 1 is a side elevational view of the dump truck 1 seen in a width direction orthogonal to the travel direction. FIG. 2 is a perspective view of the dump truck 1 as seen from a bird's eye view.

In the exemplary embodiment, X, Y and Z axes shown in each of the drawings are orthogonal to each other. Further, for the purpose of the explanation in the exemplary embodiment, with reference to FIG. 1, the travel direction of the dump truck 1 is shown by an arrow direction of the X axis, a direction from the left toward the right in the vehicle width direction is shown by an arrow direction of the Y axis, and an upward vertical direction is shown by an arrow direction of the Z axis. Hereinafter in the exemplary embodiment, sometimes, the travel direction, the opposite direction therefrom, the right direction of the vehicle width direction, and the opposite direction from the right direction thereof may respectively be referred to as "front," "back," "right," and "left."

The dump truck 1, which is a construction vehicle for delivering loads (e.g., earth and sand) at a digging site (e.g., mines), includes a chassis 2 and a dump body 3.

The chassis 2 is supported via a suspension by four tires 4 placed at both ends in the vehicle width direction and arranged in the travel direction.

The chassis 2 includes a frame 5. The frame 5 includes: a pair of side members 5A respectively extending along widthwise ends of the frame 5; and a plurality of cross members 5B extending in the vehicle width direction and connecting the pair of side members 5A (see FIG. 4).

The dump body 3 is attached to a back side of the chassis 2 using a hinge (not shown) in a manner to be raised or lowered. A cab 6 (a driver's seat) is provided on a front-left side of the chassis 2.

The dump body 3 has a rectangular load space as shown in FIG. 2 and is provided to the chassis 2 in a manner to be rotatable around the hinge (a rotary shaft). The dump body 3 is raised or lowered with respect to the chassis 2 by extending or retracting a hoist cylinder 3B provided to the back side of the chassis 2, thereby discharging loads (e.g., earth and sand).

The cab 6 serves as a driver's seat in which a driver gets on and drives the dump truck 1 as shown in FIG. 2. The driver can get on and off the cab 6 by ascending and descending a ladder 6A provided at the front side of the dump truck 1.

As shown in FIG. 1, an engine 7 is mounted on the frame 5 of the chassis 2 and a top of the engine 7 is covered with a platform 8.

Moreover, a cooling device 9 is disposed in front of the engine 7. The cooling device 9 includes: a radiator provided at a front side of a vehicle body; and a cooling fan 9A (see FIG. 4) provided at a back side of the radiator. The cooling fan 9A gathers outer air, whereby heat of a cooling water is radiated in the radiator and the cooling water is supplied to the engine 7.

Figure 4:
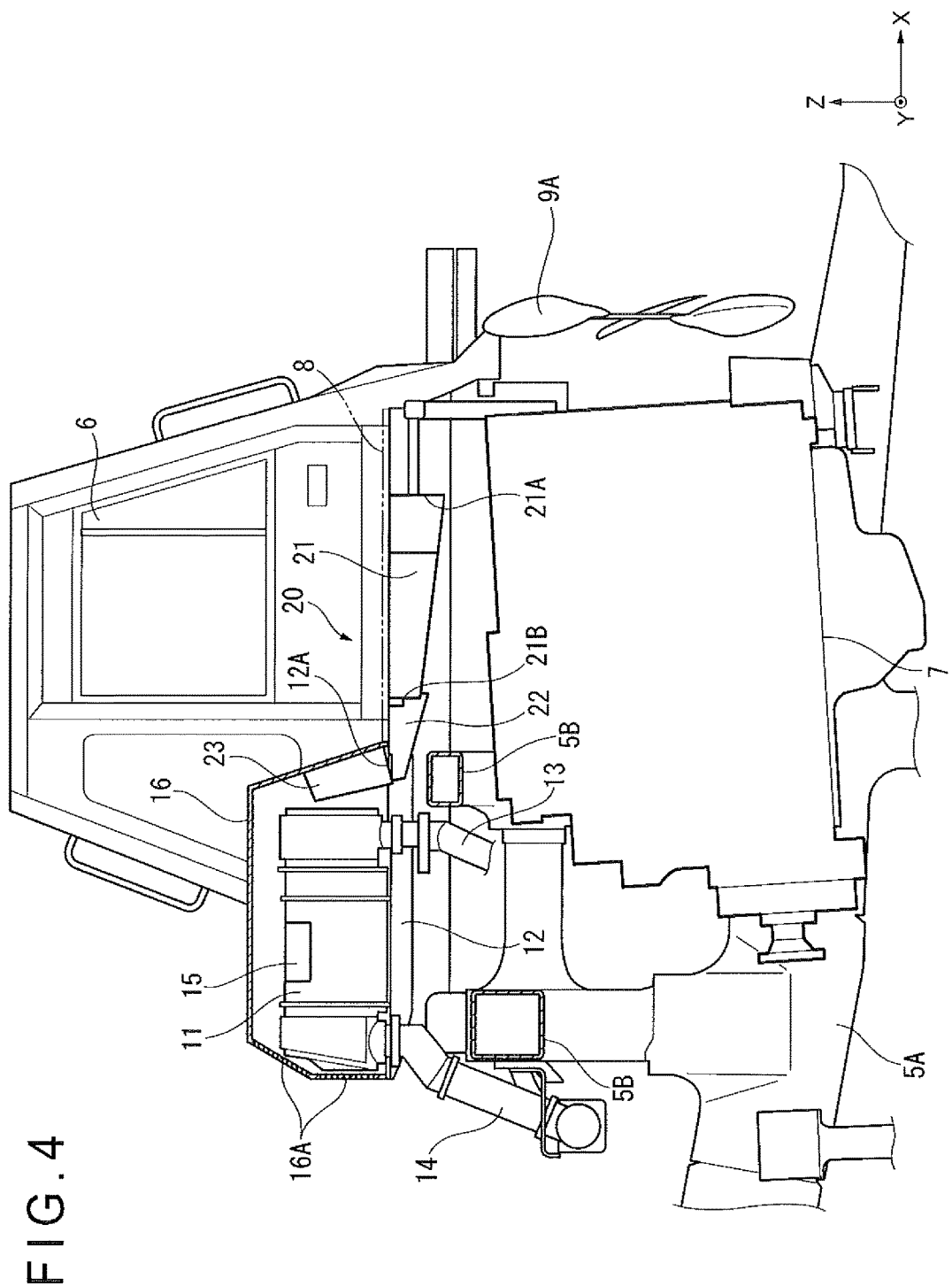
FIG. 4 is a side elevational view showing a cooling structure of the exhaust aftertreatment device according to the above exemplary embodiment as seen in a width direction.

An air cleaner 10 is provided on a right end of the platform 8 disposed to a right side of the cab 6. As shown in FIG. 4, a DPF purifying device 11 (an exhaust aftertreatment device) is housed in a cover 16 located on an inner side of the platform 8 relative to the air cleaner 10 in the vehicle width direction.

The DPF purifying device 11 is provided in a course from the engine 7 to the air cleaner 10 in order to remove PM in exhaust gas to be discharged from the engine 7.

The DPF purifying device 11 includes a filter and an oxidation catalyst and is configured to capture the PM in the exhaust gas with the filter and oxidize NO among NOx in the exhaust gas using the oxidation catalyst to increase $NO_2$.

Figure 3:
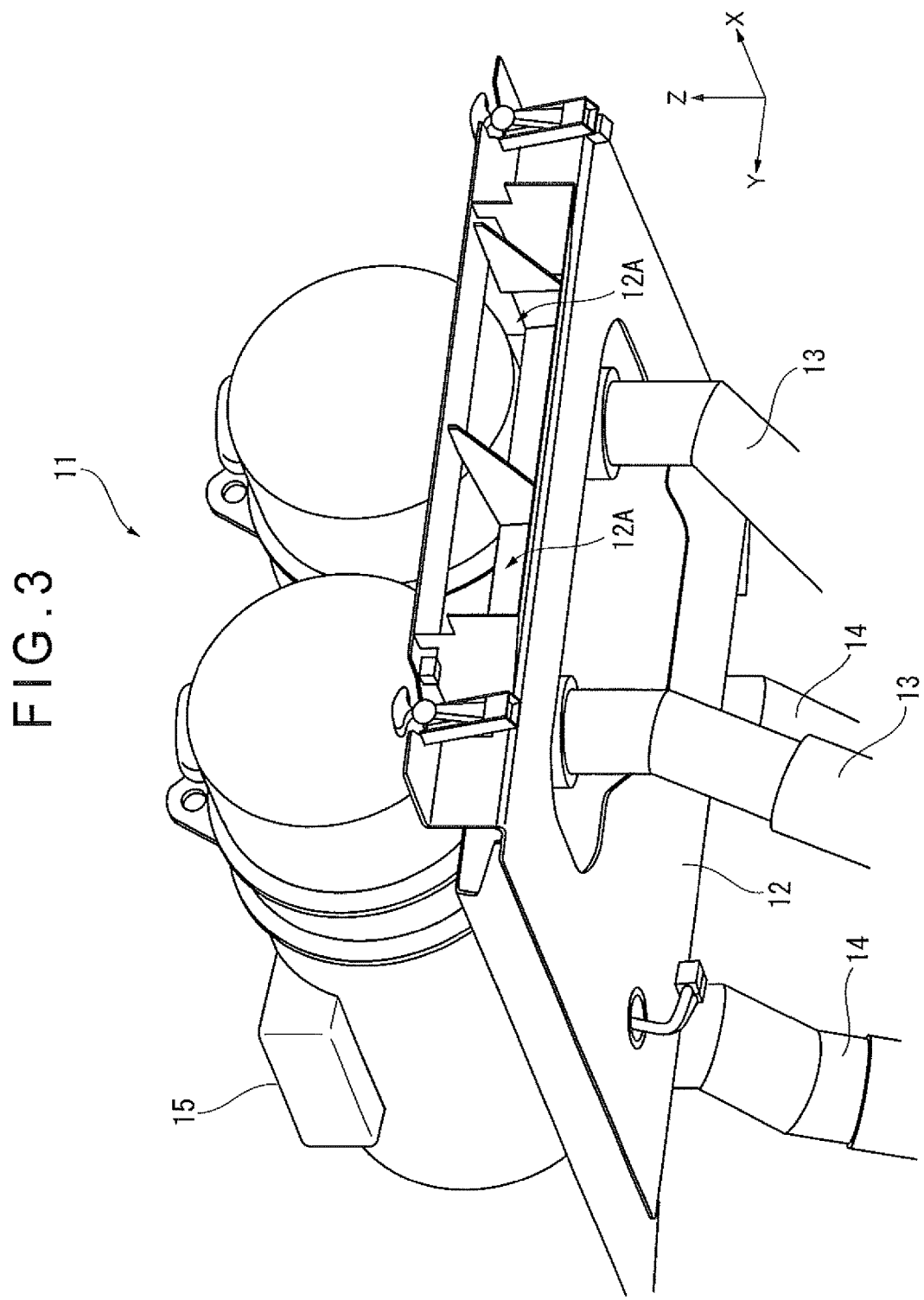
FIG. 3 is a perspective view showing an exhaust aftertreatment device according to the above exemplary embodiment as seen diagonally from the bottom.

As shown in FIG. 3, the DPF purifying device 11 is disposed on a bottom plate 12 provided on the platform 8. An opening 12A, through which an upper side of the platform 8 communicates with a lower side thereof and which gathers a cooling air flowing under the platform 8, is formed on the bottom plate 12 in front of the DPF purifying device 11.

As shown in FIG. 4, the bottom plate 12 is provided in a manner to stretch between the side members 5A of the frame 5 and is supported by the cross members 5B extending in the vehicle width direction.

An intake pipe 13 connected to the air cleaner 10 and an exhaust pipe 14 connected to an exhaust cylinder (not shown) are connected to the DPF purifying device 11. A differential pressure sensor configured to detect a differential pressure between an intake gas from the intake pipe 13 and an exhaust gas from the exhaust pipe 14 and a sensor unit 15 housing a temperature sensor for detecting a temperature of the DPF purifying device 11 are provided on a top of the DPF purifying device 11.

The differential pressure and the temperature detected by the sensor unit 15 are outputted in a form of an electrical signal to an engine controller (not shown) configured to control the engine 7. The engine controller judges that a filter is clogged when a differential pressure between gas at an intake hole connected to the intake pipe 13 and an exhaust hole connected to the exhaust pipe 14 is equal to or more than a predetermined value at the differential pressure sensor, and outputs a control signal to command a fuel injector (not shown) provided in an exhaust gas path to inject a fuel (e.g., light oil) to the DPF purifying device 11.

When the fuel is injected from the fuel injector to the DPF purifying device 11, the fuel is burned at the temperature of the exhaust gas to burn PM captured by the filter, thereby performing a regeneration process to the DPF purifying device 11 to remove the clogging. The regeneration process is performed to the DPF purifying device 11 when the dump truck 1 is stopped. Moreover, the regeneration process of the DPF purifying device 11 further includes a time-control regeneration process after the elapse of a predetermined time even during the travel of the dump truck 1.

[2] Cooling Structure 20 of DPF Purifying Device 11

Next, a cooling structure 20 of the DPF purifying device 11 will be described.

Figure 5:
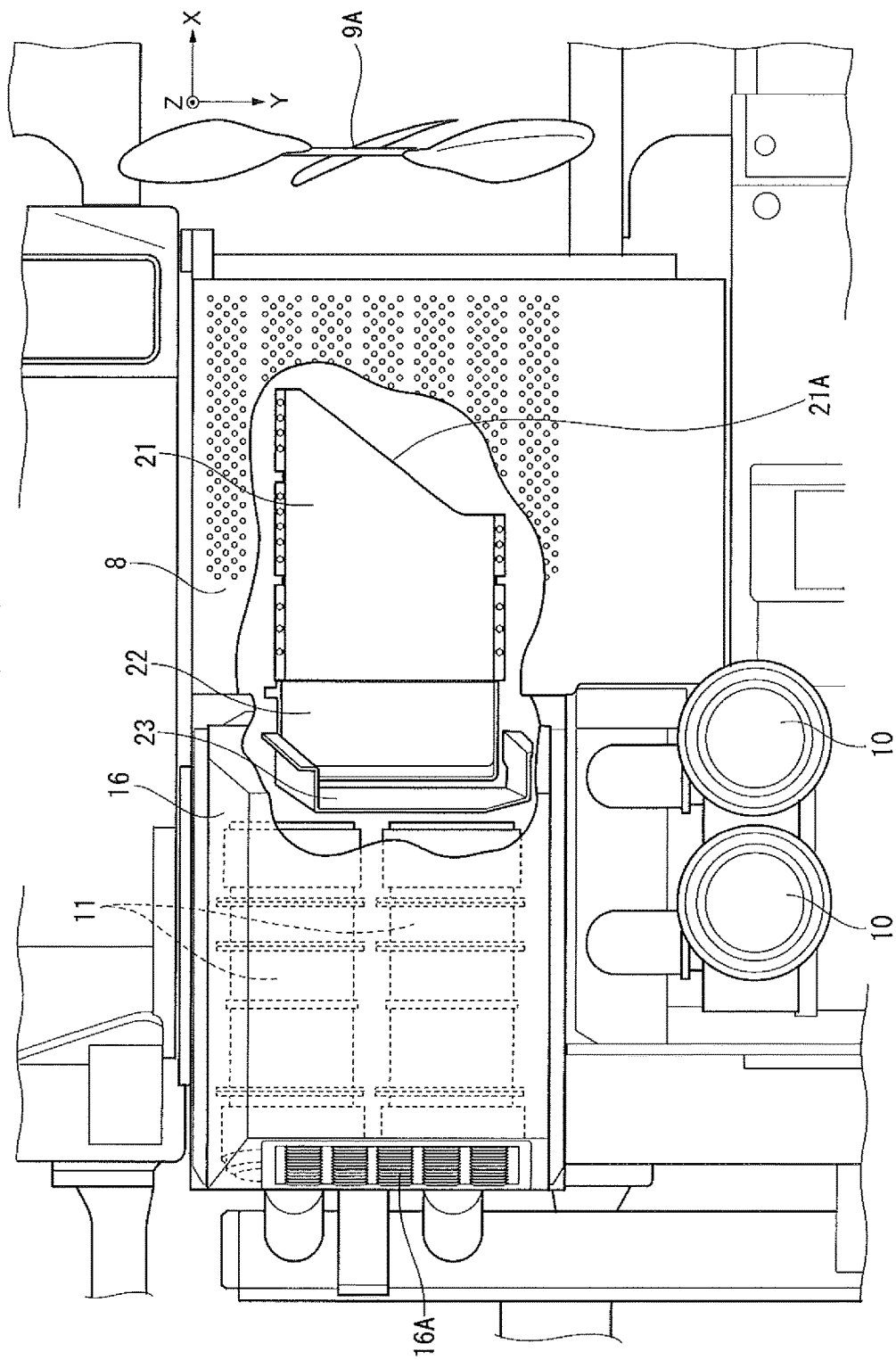
FIG. 5 is a plan view showing the cooling structure of the exhaust aftertreatment device according to the above exemplary embodiment as seen from a top view.
Figure 6:
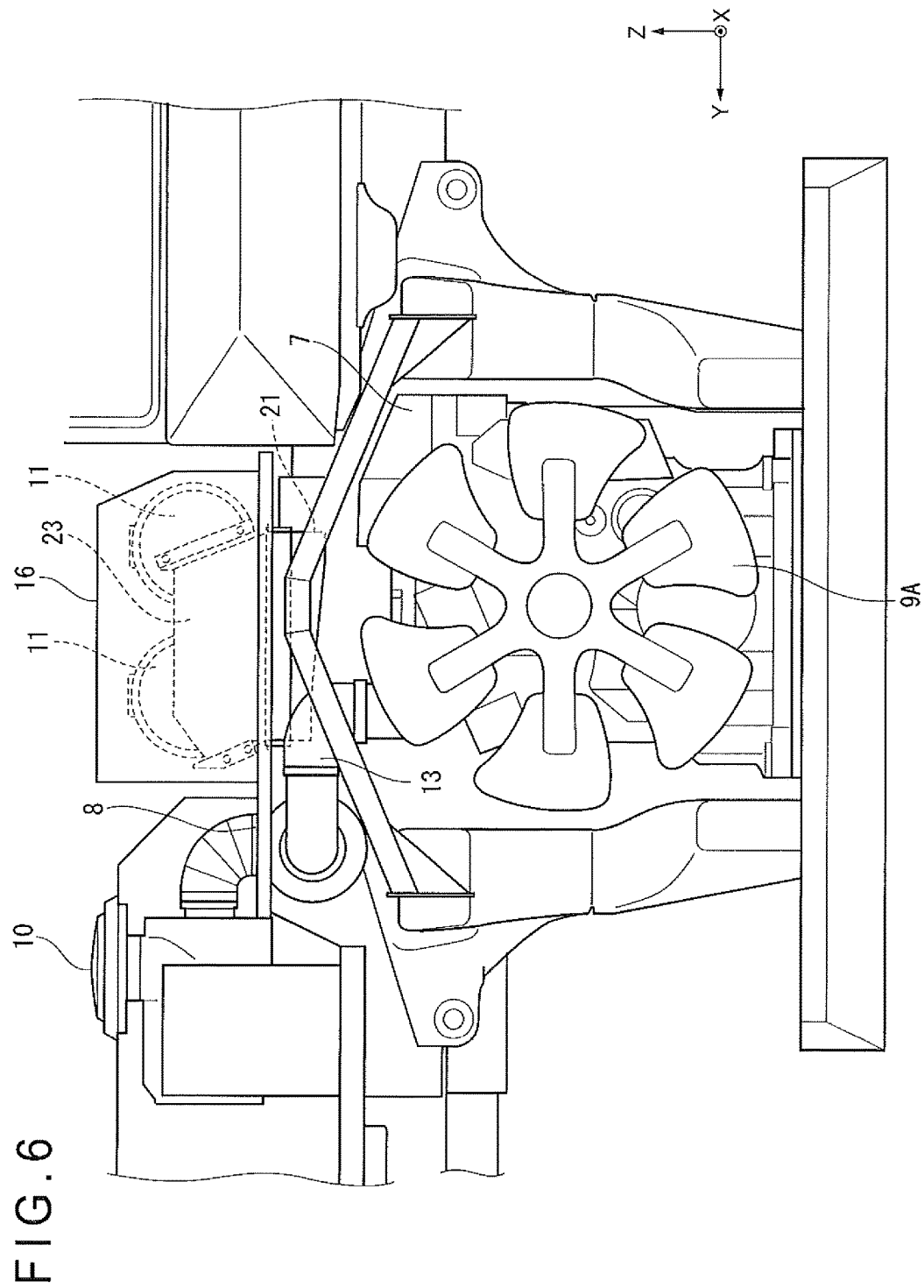
FIG. 6 is a front view seen in a travel direction showing the cooling structure of the exhaust aftertreatment device according to the above exemplary embodiment as seen in a travel direction.
Figure 7:
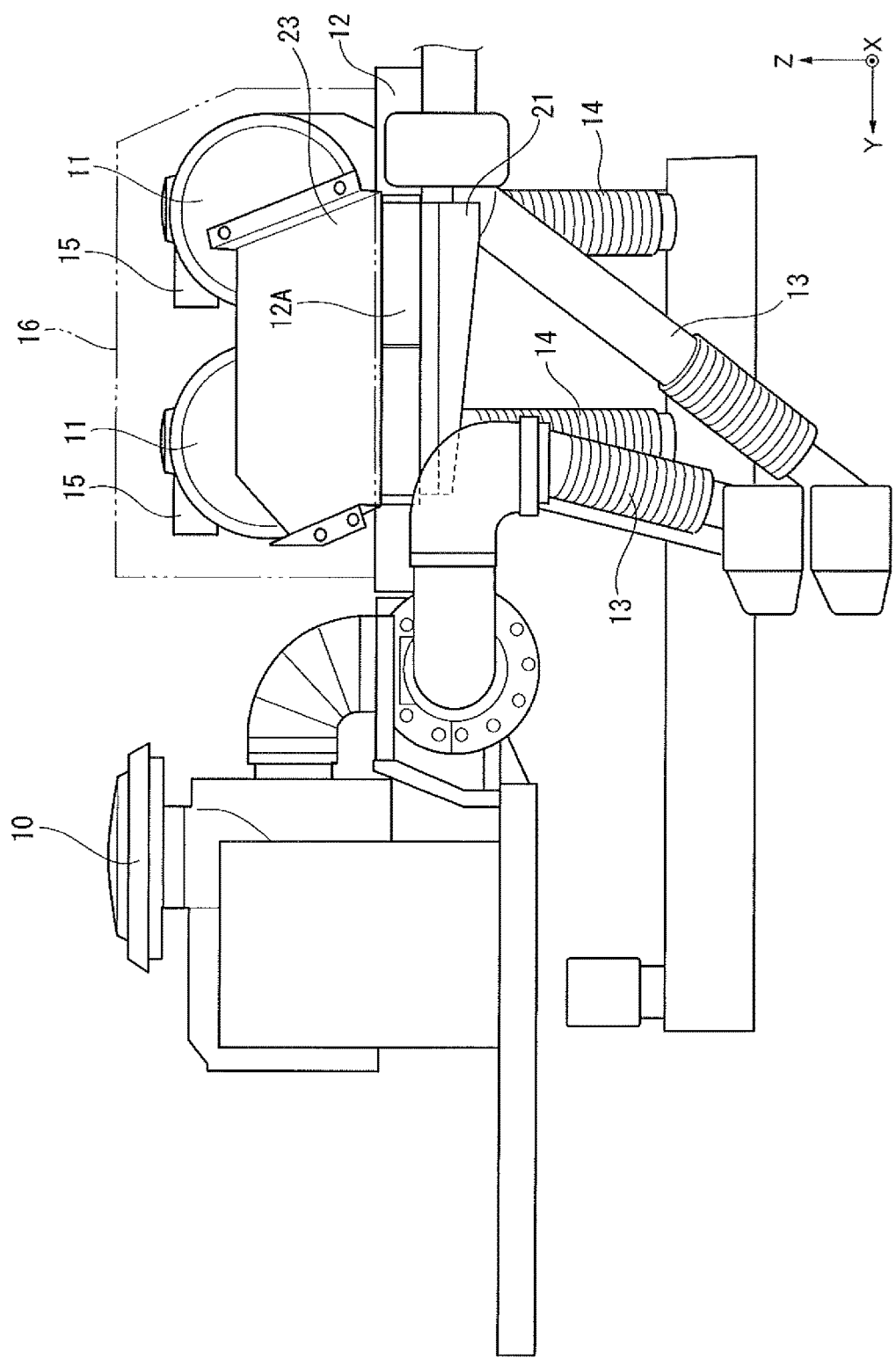
FIG. 7 is a partially enlarged view of FIG. 6 in the above exemplary embodiment.
Figure 8:
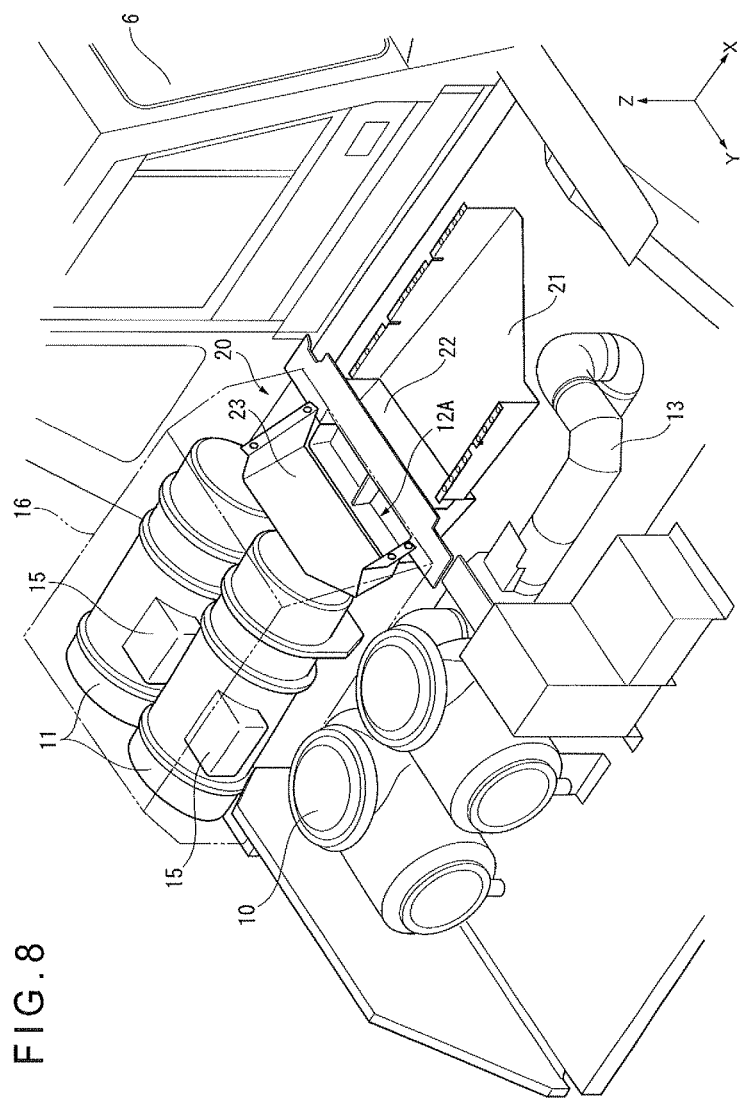
FIG. 8 is a partial enlarged view of FIG. 6 in the above exemplary embodiment as seen from a bird's eye view.

FIGS. 4 to 8 show the cooling structure 20 of the DPF purifying device 11 according to the exemplary embodiment of the invention. FIG. 4 shows a side elevational view of the cooling structure 20 seen in the vehicle width direction. FIG. 5 shows a plan view thereof seen from a top view. FIG. 6 shows a front view thereof seen from a front side of the travel direction. FIG. 7 shows a partially enlarged view of the front view of FIG. 6. FIG. 8 shows a perspective view thereof seen from a bird's eye view.

As shown in FIGS. 4 and 5, the DPF purifying device 11 is covered with the cover 16 and is disposed so that a longitudinal side of the DPF purifying device 11 conforms to the travel direction of the dump truck 1.

A cooling air for cooling the DPF purifying device 11 is gathered from the opening 12A, through which the upper side of the platform 8 communicates with the lower side thereof and which is formed on the bottom plate 12, and cools the DPF purifying device 11 inside the cover 16. The air after cooling the DPF purifying device 11 is discharged outside from a louver 16A (an exhaust hole) formed on a back side of the cover 16 near a back lateral side of the DPF purifying device 11.

With this arrangement, since the cooling air inside the cover 16 flows in a longitudinal direction of an outer circumferential surface of the DPF purifying device 11 and is discharged from the louver 16A on the back side of the cover 16, the DPF purifying device 11 can be cooled efficiently, In addition, the sensor unit 15 provided on a top of the outer circumferential surface of the DPF purifying device 11 can also be cooled efficiently.

The cooling structure 20 of the DPF purifying device 11 gathers the cooling air blown by the cooling fan 9A and cools the DPF purifying device 11. As shown in FIGS. 4 and 8, the cooling structure 20 includes a first duct 21, a second duct 22 and a partition plate 23.

As shown in FIGS. 6 and 7, the first duct 21 defines a cross-sectionally rectangular flow path and is attached to a lower surface of the platform 8 above the engine 7. A leading end of the first duct 21 in the travel direction is disposed behind a leading end of the engine 7. A leading-end opening 21A (see FIG. 4) faces an air blowing surface of the cooling fan 9A.

With this arrangement, since the cooling air blown by the cooling fan 9A is directly gathered by the first duct 21, the cooling air is gathered by the first duct 21 without being heated by the engine 7.

As shown in FIG. 4, a height of a lateral side of the first duct 21 is decreased from the leading end of the first duct 21 in the travel direction toward the base end thereof. A base-end opening 21B of the first duct 21 is connected to a leading end of the second duct 22.

With this arrangement, since an opening area of the first duct 21 is decreased from the leading end thereof toward the base end thereof, a flow speed of the gathered cooling air can be increased within the first duct 21, thereby improving the cooling efficiency.

As shown in FIGS. 5 and 8, the first duct 21 has a planar shape such that a leading end of a widthwise end (a left end in the vehicle width direction) of the first duct 21 remote from the cooling fan 9A projects forward toward the cooling fan 9A beyond a leading end of a widthwise end (a right end in the vehicle width direction) of the first duct 21. Accordingly, the leading-end opening 21A of the first duct 21 is inclined with respect to a rotation tangential direction (minus Y-axis direction) of an upper part of the cooling fan 9A.

Since the cooling fan 9A rotates clockwise seen from the front of the dump truck 1, the leading-end opening 21A of the first duct 21, which is arranged to be inclined with respect to the rotation tangential direction (minus Y-axis direction) of the upper part of the cooling fan 9A, can also gather the cooling air in the rotation tangential direction blown by the cooling fan 9A, thereby improving the cooling efficiency.

As shown in FIG. 4, the second duct 22 has a leading end that is open toward the travel direction (i.e., a leading-end opening) and a base end that is open in a horizontal direction and has an L shape in a side elevational view (i.e., a base-end opening). The leading-end opening is connected to the base-end opening 21B of the first duct 21 and the base-end opening is connected to the opening 12A formed on the bottom plate 12.

The cooling air gathered by the first duct 21 to flow in the travel direction of the dump truck 1 is directed upward by the second duct 22 to flow into the cover 16.

With this arrangement, the cooling air gathered by the first duct 21 flows through the second duct 22 to be supplied into the cover 16 from the opening 12A, so that the DPF purifying device 11 can be efficiently cooled.

As shown in FIGS. 5 and 7, the partition plate 23 is provided between the DPF purifying device 11 and the opening 12A of the bottom plate 12 in a manner to stand up from the bottom plate 12. The partition plate 23 stands diagonally backward from the bottom plate 12 and guides the cooling air gathered from the opening 12A to an upper side in the cover 16.

Moreover, the partition plate 23 has right and left ends (ends in the Y axis direction of the dump truck 1) bent in an L shape as shown in FIGS. 5 and 8 and configured to keep the cooling air guided by the partition plate 23 from flowing sideways.

Further, as shown in FIGS. 6 and 7, the partition plate 23 stands in a manner to be inclined in a diagonally left-upward direction (plus Y-axis direction of the dump truck 1) and is configured to guide the cooling air toward the sensor unit 15 provided on a left top of the DPF purifying device 11.

With this arrangement, since the cooling air gathered from the opening 12A is guided to the upper side in the cover 16 by the partition plate 23, the cooling air can be flowed to an upper side of the DPF purifying device 11 (especially to the sensor unit 15), the sensor unit 15 can be efficiently cooled to prevent the sensor unit 15 from being damaged due to the heat generated in the DPF purifying device 11.

[3] Advantage(s) of Embodiment(s)

According to the above exemplary embodiment, since the base-end opening of the second duct 22 is connected to the opening 12A of the bottom plate 12 disposed on the platform 8 and the leading-end opening 21A of the first duct 21 faces an air blowing surface of the cooling fan 9A, the cooling air of the cooling fan 9A can be guided to the DPF purifying device 11 through the first duct 21 and the second duct 22, so that the DPF purifying device 11 can be efficiently cooled to prevent failure of the sensor unit 15.

Moreover, since the engine 7 is separated from the DPF purifying device 11 by the platform 8 to position the engine 7 under the platform 8 and the DPF purifying device 11 above the platform 8, the DPF purifying device 11 can be prevented from being heated by the heat of the engine 7, so that the failure of the sensor unit 15 can be more reliably prevented.

[4] Modification(s) of Embodiment(s)

The invention is not limited to the above-described embodiment, but includes modifications and improvements as long as an object of the invention can be achieved.

For instance, although the cooling structure 20 includes the first duct 21, the second duct 22 and the partition plate 23 in the above exemplary embodiment, the arrangement of the cooling structure 20 is not limited thereto. The first duct 21 and the second duct 22 may be integrally formed.

Moreover, although the cooling structure 20 configured to cool the DPF purifying device 11 is described, the cooling structure 20 may be applied to other exhaust aftertreatment devices. The invention may be applied to a dump truck in which a urea SCR (Selective Catalytic Reduction) system is mounted as the exhaust aftertreatment device.

Specific structures and shapes of the other elements of the invention may be altered as long as an object of the invention can be achieved.

The invention claimed is:

1. A dump truck comprising:
   a vehicle body;
   a cooling fan disposed to a front side of the vehicle body in a travel direction;
   an engine disposed behind the cooling fan;
   a platform covering the cooling fan and a top of the engine;
   an exhaust aftertreatment device disposed behind the engine and above the platform;
   a communication opening that is provided in front of the exhaust aftertreatment device and through which an upper side of the platform communicates with a lower side thereof; and
   a duct provided to a lower surface of the platform and comprising a base-end opening connected to the communication opening and a leading-end opening facing an air blowing surface of the cooling fan, wherein
   the leading-end opening of the duct is inclined with respect to a rotation tangential direction of an upper part of the cooling fan.

2. The dump truck according to claim 1, further comprising:
   a cover covering the communication opening and the exhaust aftertreatment device; and
   an exhaust hole formed on a lateral side of the cover behind the exhaust aftertreatment device.

3. The dump truck according to claim 1, further comprising:
   a partition plate provided between the communication opening and the exhaust aftertreatment device in a manner to stand up from the platform.

4. The dump truck according to claim 1, wherein
   the exhaust aftertreatment device is disposed so that a longitudinal side of the exhaust aftertreatment device conforms to the travel direction.

5. The dump truck according to claim 1, wherein
   the leading-end opening of the duct is inclined such that a leading end of the duct in the rotation tangential direction projects toward the cooling fan beyond a base end of the duct.

* * * * *